United States Patent Office 3,480,703
Patented Nov. 25, 1969

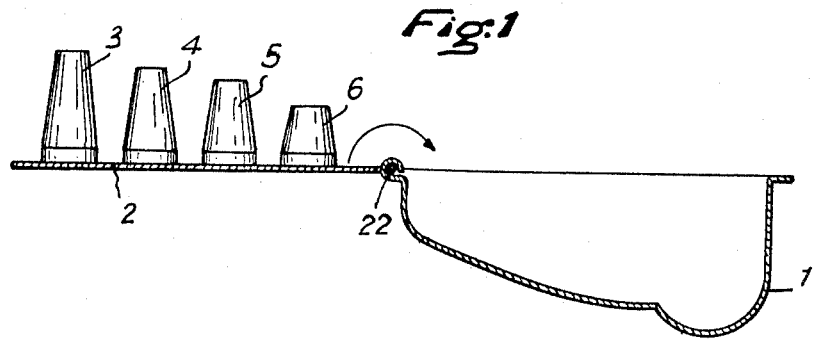
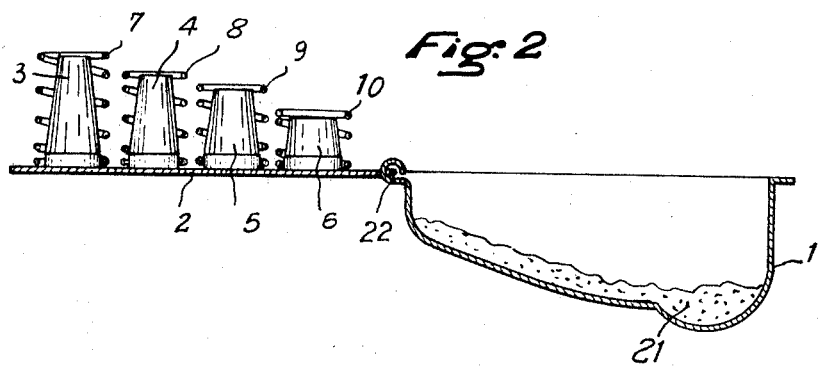
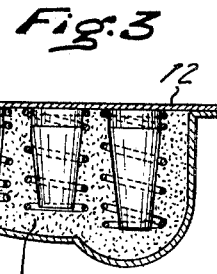
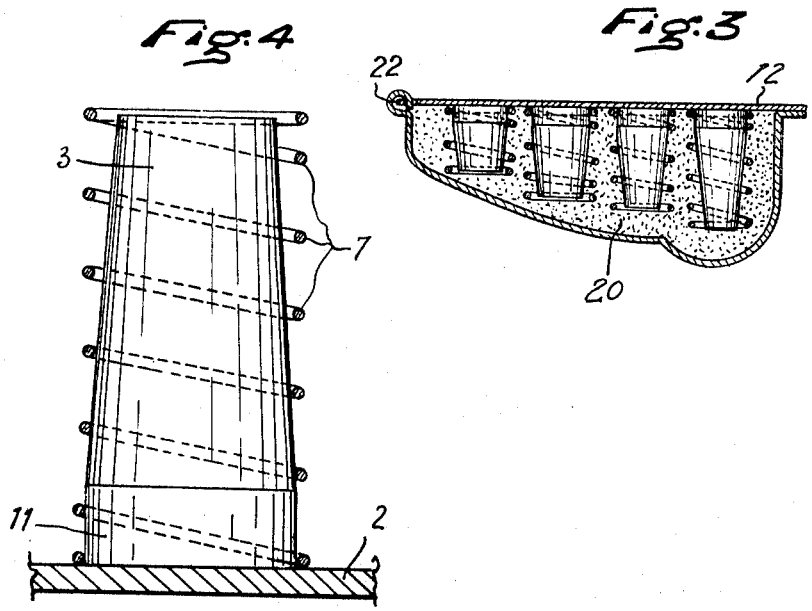

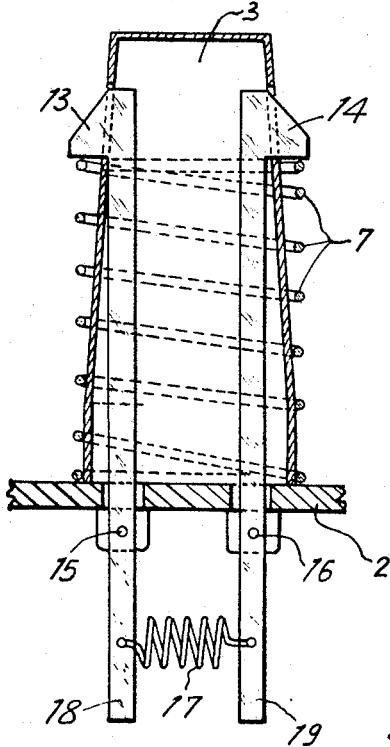
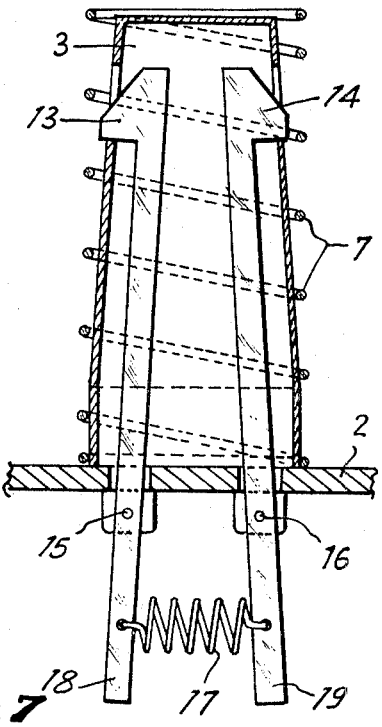
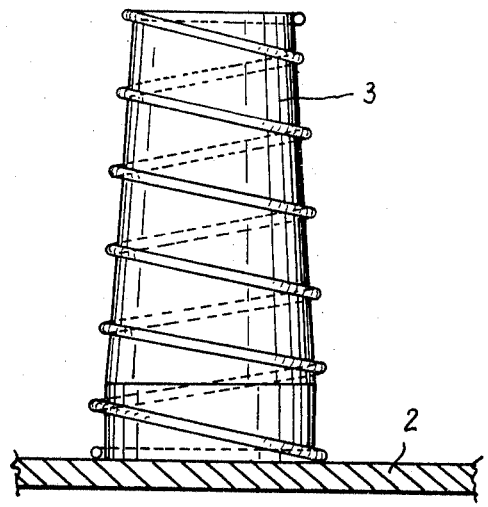

3,480,703
MATTRESSES AND PADDINGS
Victor Moritz, 10 Rue de la Pepiniere, Paris, France, and Paul Moritz, deceased, late of Chatou, France, by Madeleine France Louise Marechal, legal representative, 16 Rue Labelonye, Chatou, Yvelines, France
Filed Nov. 24, 1965, Ser. No. 510,451
Int. Cl. B29h 7/20, 9/10
U.S. Cl. 264—45                    2 Claims

ABSTRACT OF THE DISCLOSURE

Plastic foam mattresses, cushions, seats and the like are provided with springs embedded therein by use of a mold having a plurality of inwardly directed hollow mandrels on which the springs are resiliently retained during molding. The springs are compressed on the mandrels and maintained compressed during setting of the plastic foam, by means of oppositely swingable outwardly extending hooks that project into each hollow mandrel and that are moved apart to provide retainers for maintaining the springs compressed, and that are moved together for retraction from the mandrel after setting of the molded material.

---

There are already known associations of springs embedded in expanded foam of plastic material or of latex, with the object of forming mattresses, various paddings, seats for furniture or for vehicles.

The present invention is concerned with processes for manufacturing such an association as well as new products resulting from the invention.

The process consists in using, to produce the foam, a hollow mould in the form of the object to be produced and a closing piece for the mould, a process in which the latter piece carries mandrels on which are fixed the springs to be incorporated in the moulded object, each spring being held on the corresponding mandrel by the elasticity of one or more coils gripping the mandrel.

As a variant, each spring is compressed, prior to the moulding of the foam, by articulated claws, able to emerge from the hollow mandrels and bearing on the spring coil furthest from the closing piece of the mould.

Furthermore, the invention applies to products of the said process in which the springs, having been placed against the mandrels, are embedded in the dense skin of plastic material which is formed on the surface of the foam in contact with the mandrels and the springs.

The invention will now be described with reference to the accompanying drawings, which show an embodiment of the invention but in no restrictive sense:

FIGURES 1, 2 and 3 show transverse sections of the devices and successive manufacturing operations of a vehicle cushion.

FIGURE 4 is a diagram on a larger scale of a specific embodiment of a mandrel from the preceding figures.

FIGURES 5 and 6 are axial sections of a mandrel and of the disposition of a spring fixing, respectively before and after the fixing of the spring.

FIGURE 7 is a variant of FIG. 4.

In the method of moulding which forms the object of FIGS. 1 to 4, a hollow mould 1 is used, having the external form of an inverted vehicle cushion 20 (FIG. 3).

This hollow mould is attached to a closing piece 2 of the mould, a piece which here is level and which for convenience of manipulation is articulated to the hollow mould 1 about a hinge 22. The closing piece carries mandrels 3 to 6 (FIG. 1) which are intended to keep spaces in the foam, as is known.

The springs 7 to 10 are fixed by appropriate means on the mandrels shown above (FIG. 2). The hollow mould receives the liquid mixture 21 intended, by foaming and expanding in a known way, to form the elastic foam filling of the seat. The closing piece 2 is shut down on the mould until the foam is set following appropriate and known treatments, and surrounds the springs 7 to 10. The mould is then removed, which is facilitated by the truncated form of the mandrels 3 to 6.

To avoid inconveniences resulting from irregular swelling of the foaming liquid, one can provide for an excess of the said liquid, the surplus being evacuated through orifices (not shown) in the closing piece 2, then removed by scraping.

FIGURE 4 shows a method according to the invention of fixing a spring 7 on a mandrel 3. The latter carries on its base a short cylindrical part 11, of a diameter slightly greater than that of the first coil of a spring 7. This can be placed on 11, forcing it slightly, and remains without moving on the mandrel.

One can also (FIG. 7) use conical springs, applying them to conical mandrels and pressing them gently. In this case, in the finished object, the coils of these springs are embedded in the dense skin of plastic material which is formed on the surface of the mandrels and the adjacent springs, which favours the adherence of the springs to the mass of elastic foam.

As is known, the springs are sometimes placed under preliminary compression in the mass of elastic foam. FIGURES 5 and 6 show how this is achieved according to the invention.

The mandrels such as 3 (FIG. 5) are hollow and furnished inside with hooks 13 and 14 articulated at 15 and 16. These hooks have a tendency to be separated by the spring 17.

The spring 7 is engaged on the mandrel and the last coil is held under the hooks 13 and 14 which keep the spring 7 compressed in the mould.

The mould having been filled and the plastic expanded material having solidified, before proceeding to extraction from the mould, the hooks 13 and 14 are separated by the action of the levers 18 and 19.

Of course the preceding description is only concerned with non-limiting examples of the invention.

There has been shown in the drawings a mould in the form of a contoured vehicle seat, but this form may be of any kind and may be, for example, that of a mattress or a cushion. In the case of a mattress the mandrels and the springs can be all of the same size.

In what precedes, the cover has been supposed articulated about a hinge 22 but one can also, naturally, in particular when one has to make pieces of large dimensions, provide a cover completely independent of the mould and whose placement thereon is obtained with exactitude by classic methods such as centering pins.

The springs can be of any desired pattern.

The slab 2 has been supposed flat, but it can naturally have any form appropriate to the base on which the seat or cushion will rest.

Finally the mattress, cushion or seat can be covered with adhesive material on which are projected by flocking natural or artificial textile fibres, giving the seat a surface endurance and an appearance which makes any fabric covering unnecessry, which leads to great economy.

The invention claimed is:

1. In a process for molding fillings for mattresses, cushions, seats and similar objects containing springs embedded in elastic foam of plastic material by use of a mold having inwardly directed mandrels on which the springs are retained during molding; the improvement comprising applying compressive force to the springs to compress the springs on the mandrels, maintaining said compressive force applied during setting of the elastic foam of plastic material until the elastic foam has set to an elastic and self-sustaining body, and thereafter releasing said compressive force whereby the elastic foam permanently retains the springs under compression.

2. A process as claimed in claim 4, and maintaining and releasing said compressive force by moving members within said mandrels first outwardly beyond the outer contour of the mandrels to provide detents for maintaining said springs under compression, and then releasing said applied force by moving said members inwardly relative to their associated mandrels beyond the inner contours of the associated springs.

References Cited

UNITED STATES PATENTS

| | | | |
|---|---|---|---|
| 2,994,890 | 8/1961 | Wagner | 264—45 |
| 3,304,078 | 2/1967 | Hoge | 269—52 |

JULIUS FROME, Primary Examiner

L. GARRETT, Assistant Examiner

U.S. Cl. X.R.

5—352; 264—51